(12) United States Patent
Schade et al.

(10) Patent No.: US 7,322,187 B2
(45) Date of Patent: Jan. 29, 2008

(54) METALLURGICAL POWDER COMPOSITIONS AND ARTICLES AND METHODS UTILIZING THE SAME

(75) Inventors: Christopher T. Schade, Marlton, NJ (US); Jack A. Hamill, Jr., Marlton, NJ (US)

(73) Assignee: Hoeganaes Corporation, Cinnaminson, NJ (US)

( * ) Notice: Subject to any disclaimer, the term of this patent is extended or adjusted under 35 U.S.C. 154(b) by 0 days.

(21) Appl. No.: 10/910,151

(22) Filed: Aug. 3, 2004

(65) Prior Publication Data
US 2005/0112375 A1    May 26, 2005

Related U.S. Application Data

(60) Provisional application No. 60/525,571, filed on Nov. 26, 2003.

(51) Int. Cl.
*F16D 31/00* (2006.01)
(52) U.S. Cl. ........................................................ 60/326
(58) Field of Classification Search .................. 60/326
See application file for complete search history.

(56) References Cited

U.S. PATENT DOCUMENTS

| | | | |
|---|---|---|---|
| 2,667,237 A | | 1/1954 | Rabinow ...................... 188/88 |
| 4,264,356 A | * | 4/1981 | Shinagawa et al. ......... 148/310 |
| 4,289,549 A | * | 9/1981 | Kasai ........................ 252/62.54 |
| 5,102,477 A | * | 4/1992 | Iwayama et al. ........... 148/100 |
| 5,578,238 A | * | 11/1996 | Weiss et al. .............. 252/62.52 |
| 5,645,752 A | | 7/1997 | Weiss et al. .............. 252/62.54 |
| 6,382,369 B1 | | 5/2002 | Lisenker .................. 188/267.2 |
| 6,440,322 B1 | * | 8/2002 | Kim et al. ................ 252/62.52 |
| 6,510,929 B1 | | 1/2003 | Gordaninejad ........... 188/267.2 |
| 6,525,289 B2 | | 2/2003 | Ananthanarayanan et al. ... 219/78.02 |

OTHER PUBLICATIONS

Halliday Physics Part II John Wiley & Sons 1960 pp. 926-931.*

* cited by examiner

*Primary Examiner*—F. Daniel Lopez
(74) *Attorney, Agent, or Firm*—Woodcock Washburn LLP

(57) ABSTRACT

The metallurgical powder composition suspensions of the present invention include a magnetic powder having an outer oxide layer suspended in a carrier fluid. Magnetic powders include iron-based powders, such as for example, powders of iron pre-alloyed with other elements. Alloying materials include columbium, silicon, calcium, manganese, magnesium, carbon, boron, aluminum, titanium, molybdenum, chromium, copper, nickel, gold, vanadium, phosphorus, or combinations thereof. Carrier fluids include silicon-based fluids and/or oils, such as hydrocarbon oils. The outer oxide layer includes alloy materials that are reacted/complexed with oxygen. Magnetic powders exhibit low rates of oxidation over a broad temperature range. Articles incorporating metallurgical powder composition suspensions include dampeners having a chamber, a piston that reciprocates in the chamber, and a source of magnetism operatively connected to the chamber. The source of magnetism, when activated, produces a magnetic field that changes the apparent viscosity of the metallurgical powder composition suspension.

3 Claims, 5 Drawing Sheets

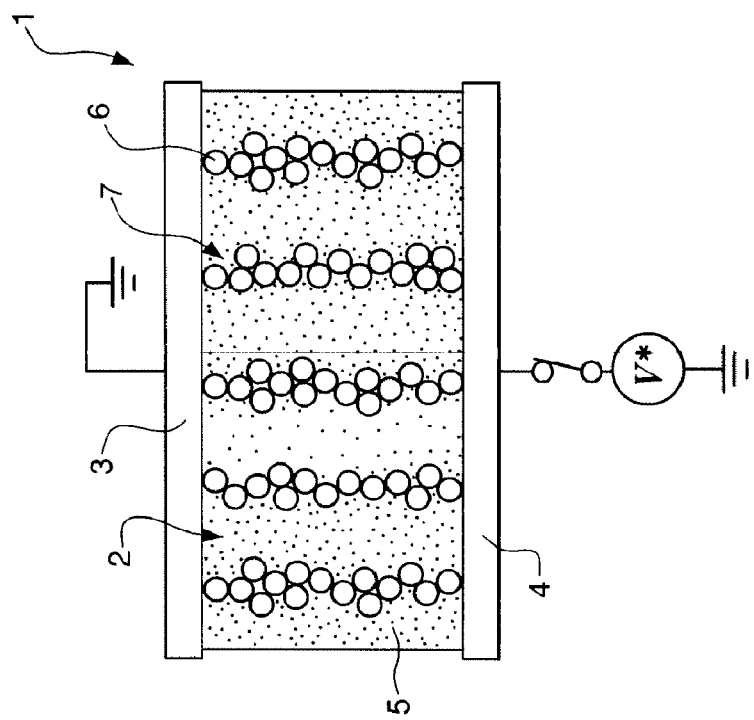
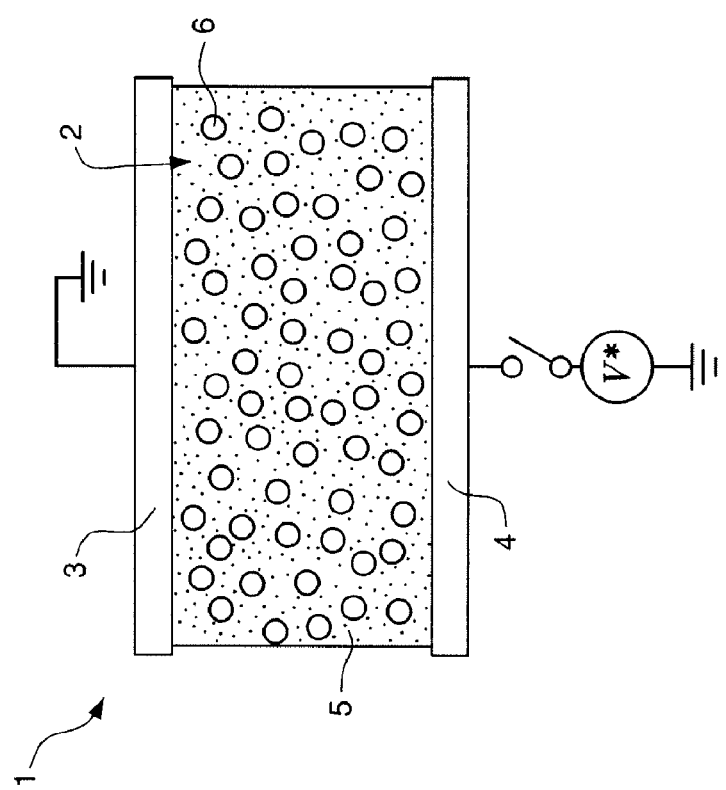

METALLURGICAL POWDER COMPOSITIONS AND ARTICLES AND METHODS UTILIZING THE SAME

CROSS-REFERENCE TO RELATED APPLICATIONS

The present application claims benefit of Provisional Application Ser. No. 60/525,571 filed Nov. 26, 2003, the disclosure of which is hereby incorporated by reference in its entirety.

FIELD OF THE INVENTION

This invention relates generally to metallurgical powder compositions, articles made therefrom, and methods of making the same. More particularly, the invention relates to magneto-rheological compositions.

BACKGROUND

Magneto-rheological fluids undergo a change in apparent viscosity in the presence of a magnetic field. Conventionally, metallurgical powder composition exhibiting magneto-rheological properties are composed of magnetic particles, such as for example ferromagnetic or paramagnetic particles, suspended in a carrier media.

When magneto-rheological compositions are exposed to a magnetic field the magnetic particles of the magneto-rheological composition become polarized and are thereby organized into chains of particles. The chains of particles align to increase the apparent viscosity, or flow resistance, of the overall fluid. In the absence of a magnetic field, the particles return to an unorganized, or free state, and the apparent viscosity, or flow resistance, of the overall material is correspondingly reduced.

Conventional magneto-rheological compositions are described in U.S. Pat. No. 2,667,237 (the 237 patent). The 237 patent teaches a dispersion of paramagnetic or ferromagnetic particles in a liquid, coolant, or semi-solid grease, for example iron powder and light machine oil. In one embodiment the 237 patent describes carbonyl iron powder.

Magneto-rheological compositions are used in linear and rotating mechanisms as a rigid bonding material, such as for example, in braking systems, vehicle suspension dampeners, and power generation devices. In dampening devices, magneto-rheological compositions permit the viscosity of a dampening fluid to be changed in response to an applied magnetic field. Ride stiffness may thereby be controlled by adjusting the current in an electric coil within a dampener. As a result, the stiffness of a suspension system is easily controlled.

The bonding strength of magneto-rheological compositions in the presence of magnetic field depends in part on the strength of the magnetic field applied to the fluid and the size of the magnetic particles. Magneto-rheological compositions having large magnetic particles exhibit a higher yield strength and greater bonding capacity.

Unfortunately, magneto-rheological compositions often suffer performance inconsistency due to the large difference between the specific gravity of the magnetic particles and that of the carrier fluid. As a result, large-sized particles tend to settle out of suspension. For example, U.S. Pat. No. 5,645,752 teaches a magneto-rheological fluid having a thixotropic network to stabilize the particles and prevent settling. Magneto-rheological compositions having smaller sized magnetic particles do not readily settle out of a suspension but exhibit lower yield strength and lower bonding capacity while also having a tendency to "cake up" more easily thereby affecting the fluidity of the composition.

Conventional magneto-rheological compositions also suffer performance degradation over time due in part to oxidation of the magnetic particles, especially in high temperature applications. Therefore, manufacturers continually seek magneto-rheological compositions that resist performance degradation and maintain high yield strength and bonding strength. Hence compositions that satisfy these requirements is desired.

SUMMARY

Metallurgical powder composition suspensions of the present invention include magnetic powder particles having an outer oxide layer, and a carrier fluid. The magnetic powder is suspended in the carrier fluid. Magnetic powders include metal based powders, such as for example, powders of iron pre-alloyed with other elements. Alloying materials include molybdenum, manganese, magnesium, chromium, silicon, copper, nickel, gold, vanadium, columbium (niobium), graphite, phosphorus, aluminum, calcium, boron, titanium, or combinations thereof. Carrier fluids include traditional hydrocarbon oils or silicon-based liquids. The outer oxide layer includes alloy materials that are complexed with oxygen.

Magnetic powders exhibit low oxidation rates over a broad temperature range, such as for example, less than about $0.25\%/min/m^2$ at 180 degrees Centigrade and less than about $0.40\%/min/m^2$ at 230 degrees Centigrade as measured by thermogravimetric analysis/differential thermal analysis.

Articles of the present invention that utilize metallurgical powder composition suspensions include devices that utilize magneto-rheological fluids, such as for example, dampeners having a chamber, a piston that reciprocates in the chamber, a metallurgical composition disposed in the chamber, and a source of magnetism operatively connected to the chamber. When activated, the source of magnetism produces a magnetic field that changes the viscosity of the metallurgical powder composition suspension. As the viscosity of the metallurgical powder composition suspensions increases, more force is required to reciprocate the piston.

BRIEF EXPLANATION OF THE FIGURES

FIG. 2a shows a circuit without a dipole moment being applied to the metallurgical powder composition suspension.

FIG. 2b shows a circuit with a dipole moment being applied to the metallurgical powder composition suspension

DETAILED DESCRIPTION

Figure 1:
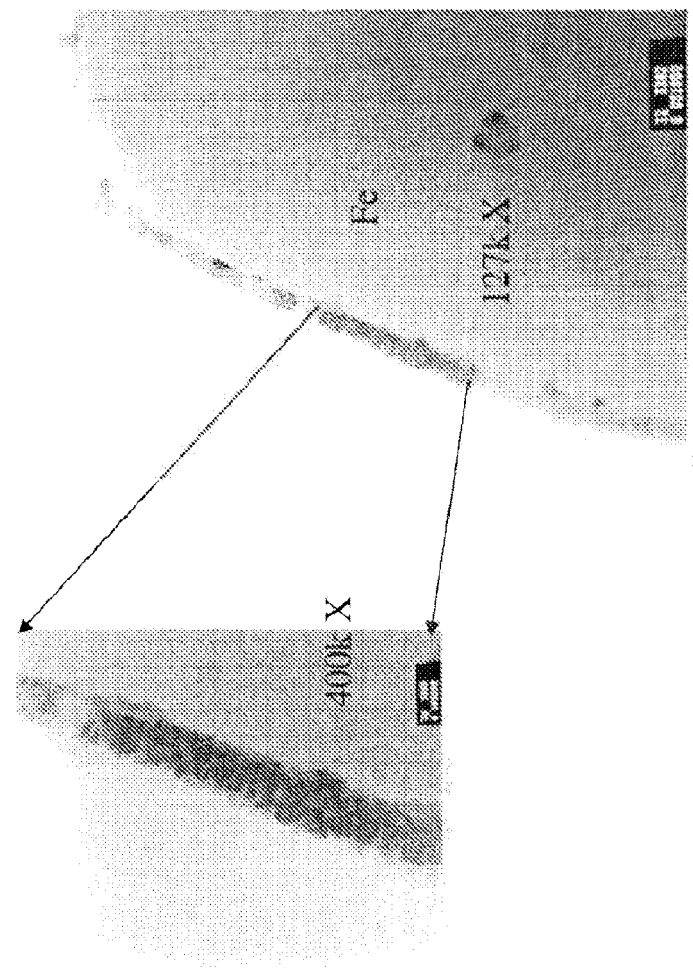
FIG. 1 shows the microstructure of an exemplary magnetic powder having an outer oxide layer.

The present invention relates to metallurgical powder composition suspensions, articles incorporating the same, and methods of making the same. Metallurgical powder composition suspension include magnetic powder particles having an outer oxide layer, and a carrier fluid. Metallurgical powder composition suspensions exhibit magneto-rheological properties whereby the viscosity of the metallurgical powder composition is changed by exposure to a magnetic field. Magnetic powders having an outer oxide layer exhibit low oxidation rates over a broad temperature range and are thereby resistant to wear, especially in applications utilizing elevated temperatures.

Articles incorporating metallurgical powder composition suspensions include conventional devices, such as for example, vehicle suspension dampeners. Dampeners include a housing, a cylinder, a piston that reciprocates in the cylinder, a metallurgical powder composition suspension and a source of magnetism operatively connected to the chamber. When activated, the source of magnetism produces a magnetic field which changes the viscosity of the metallurgical powder composition suspension contained within the chamber. As the viscosity of the metallurgical powder composition suspension increases, more force is required to reciprocate the piston.

As used herein metallurgical powder composition suspensions are compositions that exhibit magneto-rheological properties and thereby undergo a change in apparent viscosity in the presence of a magnetic field. When exposed to a magnetic field, metallurgical powder compositions become polarized and can be thought of as organized into chains of particles that are suspended in a carrier fluid. The chains of particles align to increase the apparent viscosity or flow resistance of the overall fluid. In the absence of a magnetic field, the particles return to an unorganized, or free state, and the apparent viscosity, or flow resistance, of the overall material is correspondingly reduced. Changes in apparent viscosity of the composition are measured in milliseconds. Conventional magneto-rheological compositions are disclosed in, for example, U.S. Pat. Nos. 5,645,752 & 2,667,237, each of which is herein incorporated by references in their entireties.

Metallurgical powder compositions include a magnetic powder or a blend of such powders. The magnetic powders are preferably metal-based powders of the kind generally used in the powder metallurgy industry, such as iron-based powders. Examples of iron-based powders, as that term is used herein, are powders of substantially pure iron, powders of iron pre-alloyed with other elements (for example, steel-producing elements) that enhance the strength, hardenability, electromagnetic properties, or other desirable properties of the final product, and powders of iron to which such other elements have been diffusion bonded.

Substantially pure iron powders that are used in the invention are powders of iron containing not more than about 1.0% by weight, preferably no more than about 0.5% by weight, of normal impurities. Examples of such highly compressible, metallurgical-grade iron powders are the ANCORSTEEL 1000 series of pure iron powders, e.g. 1000, 1000B, and 1000C, available from Hoeganaes Corporation, Riverton, N.J. For example, ANCORSTEEL 1000 iron powder, has a typical screen profile of about 22% by weight of the particles below a No. 325 sieve (U.S. series) and about 10% by weight of the particles larger than a No. 100 sieve with the remainder between these two sizes (trace amounts larger than No. 60 sieve). The ANCORSTEEL 1000 powder has an apparent density of from about 2.85-3.00 $g/cm^3$, typically 2.94 $g/cm^3$. Other iron powders that are used in the invention are typical sponge iron powders, such as Hoeganaes' ANCOR MH-100 powder.

The iron-based powder can optionally incorporate one or more alloying elements that enhance the soft magnetic or metallurgical properties of the final metal part. Such iron-based powders are powders of iron, preferably substantially pure iron, that have been pre-alloyed with one or more such elements. The pre-alloyed powders are prepared by making a substantially homogeneous melt of iron and the desired alloying elements, and then atomizing the melt, whereby the atomized droplets form the powder upon solidification. The melt blend is atomized using conventional atomization techniques, such as for example water atomization. In another embodiment, magnetic powders are prepared by first providing a metal-based powder, and then coating the powder with an alloying material.

Examples of alloying elements that are pre-alloyed with iron-based powders include, but are not limited to, molybdenum, manganese, magnesium, chromium, silicon, copper, nickel, gold, vanadium, columbium (niobium), graphite, phosphorus, titanium, aluminum, and combinations thereof. The amount of the alloying element or elements incorporated depends upon the properties desired in the final composition. Pre-alloyed iron powders that incorporate such alloying elements are available from Hoeganaes Corp. as part of its ANCORSTEEL line of powders.

Preferably, iron based powders are alloyed with columbium, titanium, or combination of both and at least one other alloying material. More preferably, iron based powders are alloyed with columbium and at least one other alloying material.

A further example of iron-based powders are diffusion-bonded iron-based powders which are particles of substantially pure iron that have a layer or coating of one or more other metals, such as steel-producing elements, diffused into their outer surfaces. Such commercially available powders include DISTALOY 4600A diffusion bonded powder from Hoeganaes Corporation, which contains about 1.8% nickel, about 0.55% molybdenum, and about 1.6% copper, and DISTALOY 4800A diffusion bonded powder from Hoeganaes Corporation, which contains about 4.05% nickel, about 0.55% molybdenum, and about 1.6% copper.

Other iron-based powders that are useful in the practice of the invention are ferromagnetic powders. An example is a powder of iron pre-alloyed with small amounts of phosphorus.

The particles of iron or pre-alloyed iron have a weight average particle size as small as one micron or below, or up to about 850-1,000 microns, but generally the particles will have a weight average particle size in the range of about 10-500 microns.

Carrier fluids are selected for their ability to resist changes in fluid properties due to temperature variation. Carrier fluids include conventional carrier fluids known to those skilled in the art. For example, carrier fluid include oils, such as machine oils, or silicon-based fluids. Oils include natural and synthetic hydrocarbons and vegetable oils. Carrier fluids are also selected based on the viscosity of the metallurgical powder composition suspension.

Optionally, a dispersant can also be added to metallurgical powder composition suspension to prevent metal-based powders from settling out of suspension and caking. Dispersants include conventional dispersants known to those skilled in the art, such as for example, silica or fibrous carbon.

Preferably, the magnetic powders includes less than 2.0 weight percent oxygen. More preferably, the magnetic powders includes less than 1.0 weight percent oxygen, more preferably less than 0.6 weight percent oxygen, even more preferably less than 0.4 weight percent oxygen, and still more preferably less than about 0.275 weight percent. Oxygen content is measured using thermogravimetric analysis/differential thermal analysis, such as for example using a TGA/SDTA 851 instrument. Weight percent oxygen as used herein refers to the total oxygen weight percent of the magnetic powder, including the outer oxide layer.

Metallurgical powder composition suspensions include metal based particles having an outer oxide layer. FIG. 1 shows the microstructure of an exemplary magnetic powder having an outer oxide layer. Referring to FIG. 1, the oxide layer is formed during atomization of the magnetic powder. Magnetic powders are atomized using conventional atomization techniques known to those skilled in the art, such as for example, liquid atomization techniques. During atomization, an oxide layer forms as ambient oxygen reacts/complexes with magnetic powder particles.

Oxygen complexes with individual components of the magnetic powder. For example, iron based powders that are prealloyed with alloying materials will include an outer oxide layer that include iron complexed with oxygen, i.e., iron oxide, and also alloying materials that are complexed with oxygen, e.g., columbium-oxide.

The oxide layer substantially covers the surface of the magnetic powder particles. Without being limited by theory it is believed that an outer oxide layer that includes alloyed materials complexed with oxygen forms a barrier to subsequent oxidation thereby creating a passive barrier around each magnetic powder particle.

The outer oxide layer also provides beneficial magnetic properties. The outer oxide layer increases resistivity, enhances permeability, structural density, and core loss properties. For example, a magnetic powder having a density of 690 MPa g/cm$^3$ exhibits an initial permeability of 80, maximum permeability of 210, coercive force of 4.7 Oe, and an induction at 40 Oe of 7,700. The ability to resist degradation at elevated temperatures permits magnetic powders to be heat treated to relieve stress formed during high pressure compaction. Heat treatment to relieve stress minimizes strain related hysteresis loss which enhances soft magnetic performance. Such powders are beneficial for iron-polymer composites and iron powder core applications. The outer oxide layer does not detract from the soft magnetic properties of iron based magnetic powders.

Preferably the outer oxide layer has a low porosity, i.e., small pore space. Without being limited by theory, it is believed that limiting the porosity of the outer oxide layer limits oxidation of the magnetic powder.

The outer oxide layer is less then about 700 angstroms thick. More preferably the outer oxide layer is from about 1 to about 500 angstroms thick. Even more preferably, the outer oxide layer is from about 5 to about 500 angstroms thick. Still more preferably, the outer oxide layer is from about 5 to about 100 angstroms thick. Even more preferably, the outer oxide layer is from about 20 to about 50 angstroms thick.

Preferably, magnetic powders exhibit an oxidation rate of less than about 0.75%/min/m$^2$ at 180 degrees centigrade as measured by thermogravimetric analysis/differential thermal analysis. More preferably, magnetic powders exhibit an oxidation rate of less than about 0.50%/min/m$^2$ at 180 degrees centigrade, and even more preferably less than about 0.25%/min/m$^2$ at 180 degrees centigrade. Preferably, magnetic powders exhibits an oxidation rate of less than about 1.20%/min/m$^2$ at 230 degrees centigrade. More preferably, magnetic powders exhibits an oxidation rate of less than about 0.80%/min/m$^2$ at 230 degrees centigrade, and even more preferably less than about 0.40%/min/m$^2$ at 230 degrees centigrade.

In one embodiment, metallurgical powder composition suspensions include magnetic powders composed of from about 0.01 to about 0.4 weight percent, based on the total weight of the magnetic powders, of columbium. More preferably, metallurgical powder composition suspensions include magnetic powders composed of from about 0.05 to about 0.2 weight percent columbium, and even more preferably from about 0.08 to about 0.15 weight percent, columbium.

In another embodiment, metallurgical powder composition suspensions include magnetic powders composed of from about 0.01 to about 0.4 weight percent, based on the total weight of the magnetic powders, of columbium, from about 0.01 to about 0.50 weight percent silicon, and from about 0.01 to about 0.20 weight percent boron. More preferably magnetic powders include from about 0.05 to about 0.2 weight percent columbium, from about 0.05 to about 0.35 weight percent silicon, and from about 0.01 to about 0.10 weight percent boron. Even more preferably magnetic powders include from about 0.08 to about 0.15 weight percent columbium, from about 0.10 to about 0.20 weight percent silicon, and from about 0.03 to about 0.05 weight percent boron.

In another embodiment, metallurgical powder composition suspensions are composed of magnetic powders including from about 0.01 to about 0.10 weight percent, based on the total weight of the magnetic powders, of aluminum. More preferably magnetic powders include from about 0.01 to about 0.05 weight percent aluminum, and even more preferably from about 0.01 to about 0.02 weight percent aluminum.

In another embodiment, metallurgical powder composition suspensions are composed of magnetic powders including from about 0.001 to about 0.03 weight percent, based on the total weight of the magnetic powder, of calcium. More preferably magnetic powders include from about 0.001 to about 0.02 weight percent calcium, and even more preferably from about 0.01 to about 0.015 weight percent calcium.

In another embodiment, metallurgical powder composition suspensions are composed of magnetic powders including from about 0.1 to about 0.2 weight percent, based on the total weight of the magnetic powder, of manganese. More preferably magnetic powders include from about 0.25 to about 0.1 weight percent manganese, and even more preferably from about 0.5 to about 0.75 weight percent aluminum and or titanium.

In another embodiment, metallurgical powder composition suspensions are composed of magnetic powders composed of about 0.015 weight percent, based on the total weight of the magnetic powder, of carbon, about 0.6 weight percent oxygen, from about 0.5 to about 0.75 weight percent manganese, from about 0.08 to about 0.15 weight percent columbium, from about 0.10 to about 0.20 silicon, about 0.02 weight percent aluminum, and about 0.012 weight percent calcium.

Articles of the present invention include linear and rotating mechanisms using a metallurgical powder composition suspension as a rigid bonding material, such as for example, in braking systems, vehicle suspension dampeners, and power generation devices. Utilizing metallurgical powder composition suspensions in these devices enables the viscosity of a dampening fluid to be regulated during operation by applying a magnetic field to the dampening fluid. Ride stiffness, for example, may thereby be controlled by adjusting the current in an electric coil that applies a magnetic field to the metallurgical powder composition suspension within a dampener. As a result, the stiffness of the suspension system may be easily controlled. The bonding strength of the metallurgical powder composition suspension in the presence of magnetic field depends in part on the strength of the magnetic field applied and the size of the magnetic powder particles. Conventional linear and rotating mechanisms using magneto rheological fluids are described in, for example, U.S. Pat. Nos. 6,382,369, 6,510,929, and 6,525,289, each of which are herein incorporated by reference in their entireties.

FIGS. 2a & 2b show a circuit incorporating a metallurgical powder composition suspension. FIG. 2a shows a circuit without a dipole moment being applied to the metallurgical powder composition suspension. FIG. 2b shows a circuit with a dipole moment being applied to the metallurgical powder composition suspension. Referring to FIGS. 2a and 2b, circuit 1 shows the general performance of metallurgical powder composition suspension. Circuit 1 includes a metallurgical powder composition suspension 2, a first electrode 3 and a second electrode 4. Metallurgical powder composition suspension 2 is disposed between first and second electrodes 3 and 4.

Metallurgical powder composition suspension 2 includes a carrier fluid 5 and a magnetic powder 6. Electrodes 3 and 4 are composed of any type of conducting material.

In operation, electrodes 3 and 4 can be active or not active. When electrodes 3 and 4 are not active, as shown in FIG. 2a, magnetic powder 6 is evenly dispersed throughout carrier fluid 5 in a random manner and metallurgical powder composition suspension 2 flows freely between electrodes 3 and 4. When electrodes 3 and 4 are active, electricity flows through circuit 1 and a dipole moment is introduced to magnetic powder 6, causing the particles to align in the direction of the electric charge or magnetic field. Aligned particles 7 cause metallurgical powder composition suspension 2 to become more viscous and approach solid form as the strength of the magnetic field or electric charge increases. When the electric charge or magnetic field is removed, magnetic powder 6 return to its random arrangement and metallurgical powder composition suspension 2 returns to its less viscous state.

Figure 3:
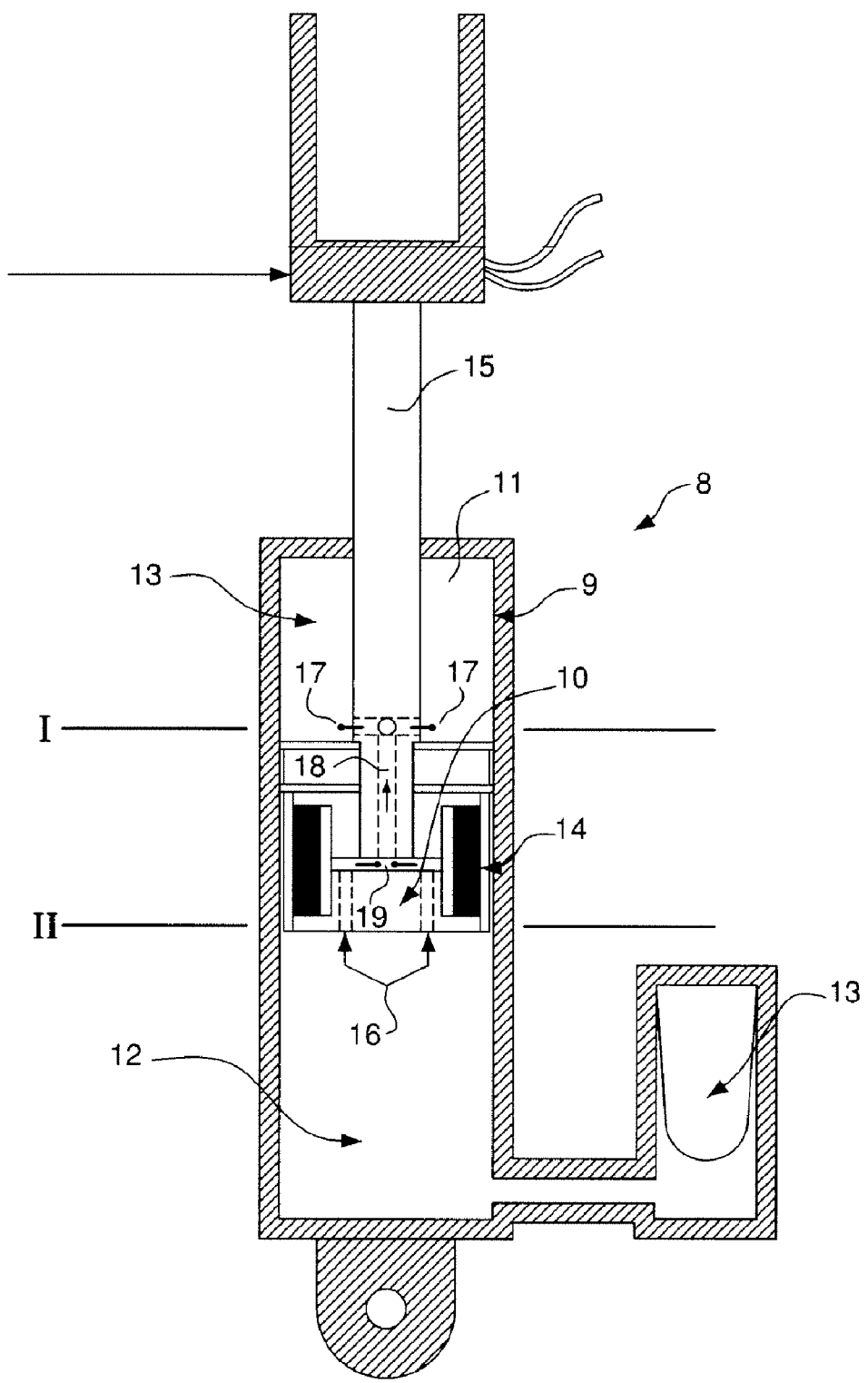
FIG. 3 shows a dampener incorporating a metallurgical powder composition suspension.
Figure 4:
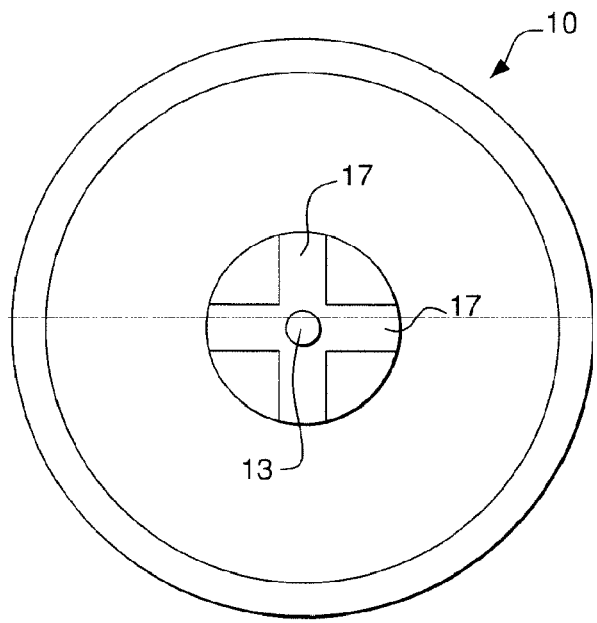
FIG. 4 shows a cross section view, across line I, of the dampener of FIG. 3.
Figure 5:
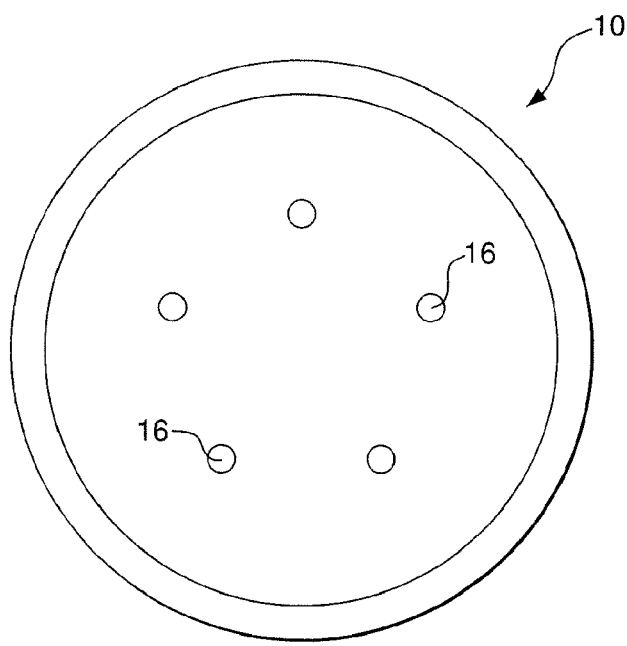
FIG. 5 shows another cross section view, across line II, of the dampener of FIG. 3.

In another embodiment, metallurgical powder composition suspensions are incorporated in vibration dampeners. FIG. 3 shows a dampener incorporating a metallurgical powder composition. FIG. 4 shows a cross section view, across line I, of the dampener of FIG. 3. FIG. 5 shows another cross section view, across line II, of the dampener of FIG. 3. Referring to FIGS. 3, 4, and 5, a vibration dampener 8 includes a housing 9, a piston 10, a cylinder 11, a compression chamber 12, a recovery chamber 13, and a magnetic coil 14. Cylinder 11 is disposed in housing 9.

Piston 10 includes a piston rod 15, a plurality of inlet ports 16, and a plurality of exit ports 17, a central conduit 18 through the center of piston rod 15, and a magnetizable conduit 19. Piston 10 is reciprocally mounted in cylinder 11 and divides the cylinder 11 into a compression chamber 12 and a recovery chamber 13.

Magnetic coil 14 is operatively disposed in piston 10 so that it can apply a magnetic field to fluid disposed in magnetizable conduit 19.

In operation, metallurgical powder composition suspension 2 is disposed in compression chamber 12. Piston 10 compresses metallurgical powder composition suspension 2 which flows under pressure into piston 10 via plurality of inlet ports 16. The metallurgical powder composition suspension 2 flows from plurality of inlet ports 16 to magnetizable conduit 19. From magnetizable conduit 19, the metallurgical powder composition suspension flows through central conduit 13 to a plurality of exit ports 17. The metallurgical powder composition suspension 2 flows from piston 10 via exit ports 17 to recovery chamber 13.

Magnetic coil 14 can be active or not active. When magnetic coil 14 is not active, magnetic powder 6 is evenly dispersed throughout carrier fluid 5 in a random manner and metallurgical powder composition suspension 2 readily flows in the magnetizable conduit 19. When magnetic coil 14 is active, electricity flows through the magnetic coil 14 and a dipole moment is introduced to metallurgical powder composition suspension 2, causing magnetic powder particles to align in the direction of the electric charge or magnetic field. Aligned magnetic powder particles cause metallurgical powder composition suspension 2 to become more viscous and approach solid form as the strength of the magnetic field or electric charge increases. When the electric charge or magnetic field is removed, the magnetic powder returns to its random arrangement and metallurgical powder composition suspension 2 returns to its less viscous state.

As the metallurgical powder composition suspension 2 becomes more viscous, the piston 10 must apply more compressive force in order for the metallurgical powder composition suspension 2 to flow through the magnetizable conduit 19. Thus, the amount of force absorbed by the dampener is regulated by controlling the strength of the magnetic field applied to the metallurgical powder composition suspension 2 in the magnetizable conduit 19.

Those skilled in the art will appreciate that numerous changes and modifications may be made to the preferred embodiments of the invention and that such changes and modifications may be made without departing from the spirit of the invention. The following examples further describe metallurgical powder composition suspensions.

EXAMPLES

The following examples, which are not intended to be limiting, present certain embodiments and advantages of the present invention. Unless otherwise indicated, any percentages are on a weight basis.

Tests were conducted to compare the oxidation of a magnetic powder and a reference carbonyl powder. Air was passed over a magnetic powder and a reference carbonyl powder at various temperatures from room temperature to close to melting point temperature. The capacity of each sample to oxidize was measured using a TGA/SDTA 851e instrument with air as the purge gas. No precautions were utilized to remove moisture from the purge gas.

The weight of the sample was recorded over time. Any increase in weight was attributed to oxidation of the sample, i.e., degradation. Each experiment increased temperature by 30° C. per minute. Each experiment utilized a platinum crucible to hold the sample powder.

The Reference Composition is composed of a carbonyl ferrous powder composed of greater than 99.5% iron, less than 0.05% carbon, less than 0.3% oxygen, less than 0.01% nitrogen. The Reference Composition had a tap density of 4.0 g/cm3 and a particle size distribution of:

| | |
|---|---|
| d10 | 3 micrometer |
| d50 | 5 micrometer |
| d90 | 10 micrometer |

The Test Composition was composed of a metallurgical powder composition composed of 0.015 weight percent carbon, 0.009 weight percent sulfur, 0.77 weight percent oxygen, 0.0086 weight percent nitrogen, 0.008 weight percent phosphorus, 0.16 weight percent silicon, 0.34 weight percent boron, 0.70 weight percent manganese, 0.02 weight percent copper, 0.02 weight percent nickel, 0.02 weight percent molybdenum, 0.12 weight percent columbium, and the remainder an iron based powder. He particles of the Test Composition were coated with an oxide layer during atomization.

Figure 6:
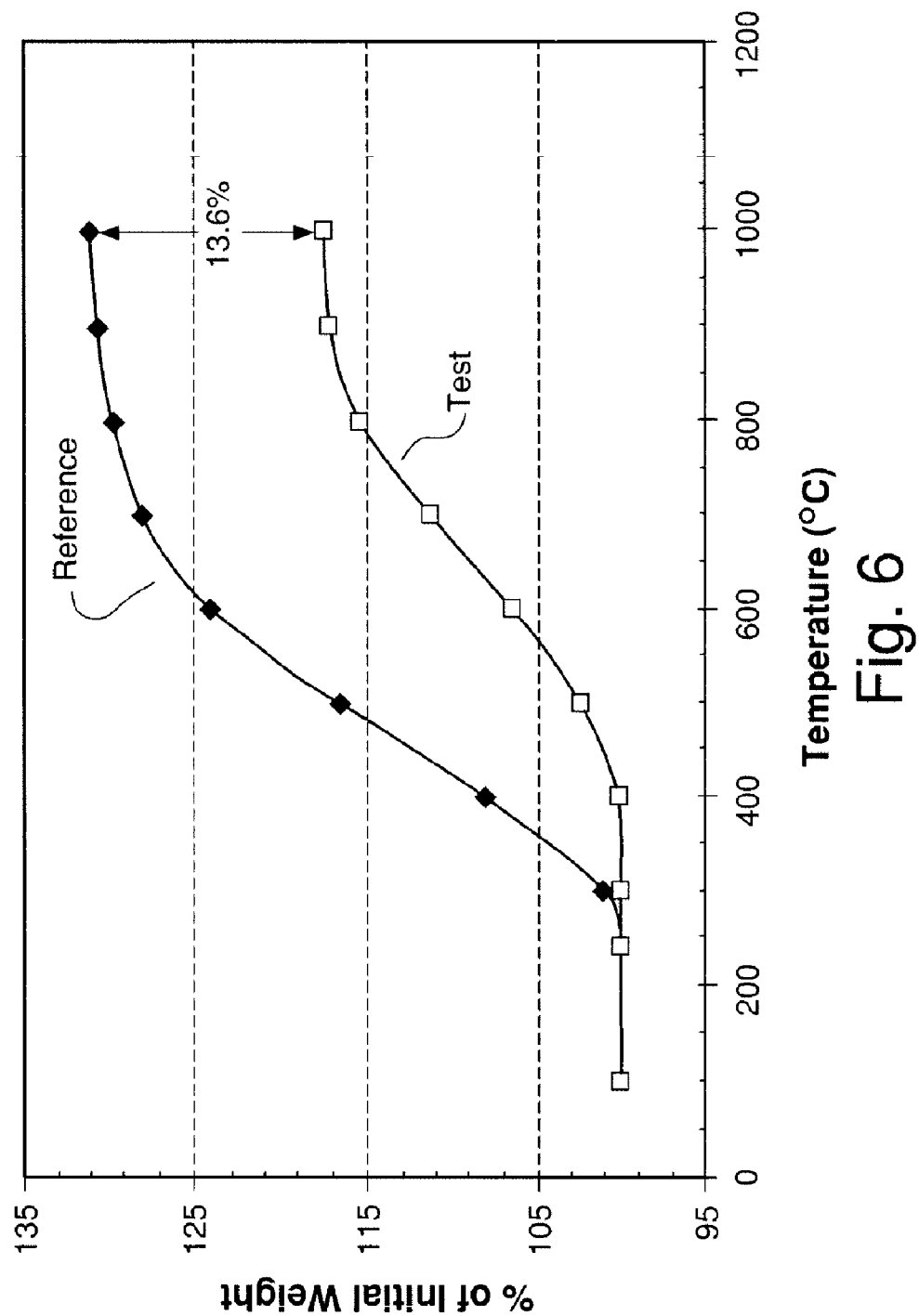
FIG. 6 shows a graph indicating the oxidation rate of a magnetic powder.

FIG. 6 shows a graph indicating the oxidation rate of a magnetic powder. Referring to FIG. 6, the increase in weight percent oxygen at various temperatures is shown in Table 1 below:

TABLE 1

| Temperature (° C.) | Reference Composition (% of initial weight) | Test Composition (% of initial weight) |
|---|---|---|
| 100 | 100 | 100 |
| 200 | 100 | 100 |
| 300 | 101 | 100 |
| 400 | 108 | 100.2 |
| 500 | 116.5 | 102.5 |
| 600 | 124 | 106.6 |
| 700 | 128 | 111.3 |
| 800 | 129.7 | 115.4 |
| 900 | 130.5 | 117 |
| 1000 | 130.99 | 117.35 |

As shown in Table 1, the Test Composition exhibits less weight gain compared to the Reference composition and therefore a greater resistance to oxidation. The metallurgical powder composition experienced 13.6 percent less oxidation than the carbonyl powder.

What is claimed is:

1. A metallurgical powder composition suspension comprising:
    a carrier fluid, and
    a prealloyed magnetic powder that is a soft magnetic material comprising:
        about 0.015 weight percent of carbon;
        about 0.6 weight percent oxygen;
        from about 0.5 to about 0.75 weight percent manganese;
        from about 0.08 to about 0.15 weight percent columbium;
        from about 0.10 to about 0.20 silicon;
        about 0.02 weight percent aluminum; and
        about 0.012 weight percent calcium;
    wherein the prealloyed magnetic powder has an outer oxide layer and is suspended in the
    carrier fluid.

2. The metallurgical powder composition suspension of claim 1 wherein the outer oxide layer is from about 5 to about 500 angstroms thick.

3. The metallurgical powder composition suspension of claim 1 wherein the prealloyed magnetic powder further comprises molybdenum, magnesium, chromium, copper, nickel, vanadium, graphite, phosphorus, boron, titanium, or combinations thereof.

* * * * *